United States Patent
Hemmelmann et al.

(10) Patent No.: US 8,901,761 B2
(45) Date of Patent: Dec. 2, 2014

(54) VARIABLE SPEED ELECTRIC MACHINE AND METHOD FOR GENERATING ELECTRIC ENERGY

(75) Inventors: Jan Erich Hemmelmann, Munich (DE); Manoj Ramprasad Shah, Latham, NY (US)

(73) Assignee: General Electric Company, Niskayuna, NY (US)

( * ) Notice: Subject to any disclaimer, the term of this patent is extended or adjusted under 35 U.S.C. 154(b) by 325 days.

(21) Appl. No.: 13/369,838

(22) Filed: Feb. 9, 2012

(65) Prior Publication Data

US 2013/0207391 A1    Aug. 15, 2013

(51) Int. Cl.
*H02P 9/48* (2006.01)

(52) U.S. Cl.
USPC .............................. 290/44; 310/113; 310/266

(58) Field of Classification Search
None
See application file for complete search history.

(56) References Cited

U.S. PATENT DOCUMENTS

| | | | |
|---|---|---|---|
| 8,188,633 B2 * | 5/2012 | Quere | 310/268 |
| 8,492,915 B2 * | 7/2013 | Koeppen et al. | 290/36 R |
| 8,593,030 B2 * | 11/2013 | Mondal et al. | 310/184 |
| 2009/0273192 A1 | 11/2009 | Guven et al. | |
| 2009/0278352 A1 | 11/2009 | Rivas et al. | |
| 2009/0315329 A1 * | 12/2009 | Duffey et al. | 290/44 |
| 2010/0026089 A1 | 2/2010 | Anghel et al. | |
| 2010/0052323 A1 | 3/2010 | Vyas et al. | |
| 2010/0230966 A1 | 9/2010 | Pavlak | |
| 2011/0198846 A1 | 8/2011 | Wakasa et al. | |
| 2012/0161572 A1 * | 6/2012 | Shim | 310/261.1 |

FOREIGN PATENT DOCUMENTS

| | | |
|---|---|---|
| CA | 2361368 C | 6/2000 |
| CN | 101699760 A | 4/2010 |
| EP | 1394928 A2 | 3/2004 |
| EP | 2209206 A1 | 7/2010 |

OTHER PUBLICATIONS

Ofner et al., "Steady State Modeling of Doubly Fed Induction Generators for Mega Watt Class Wind Turbines", XIX International Conference on Electrical Machines—ICEM 2010, Rome, Sep. 6-8, 2010, 5, 6 pages.

* cited by examiner

*Primary Examiner* — Michael Zarroli
(74) *Attorney, Agent, or Firm* — Jason K. Klindtworth

(57) ABSTRACT

A variable speed electric machine and a method for generating electric energy is provided. The electric machine includes an outer stator with a first set of field windings. Further, the electric machine includes a modulator outer rotor that is concentric and is located proximate to the outer stator. The modulator outer rotor is operatively coupled to an input shaft. Furthermore the electric machine includes a permanent magnet inner rotor concentric to the modulator outer rotor. The electric machine also includes an inner stator with a second set of field windings. The inner stator is concentric to the inner rotor and is operatively coupled to an electric grid. The outer stator, the modulator outer rotor, inner stator and the inner rotor are magnetically coupled with each other so as to maintain a constant electric frequency at the inner stator.

21 Claims, 4 Drawing Sheets

VARIABLE SPEED ELECTRIC MACHINE AND METHOD FOR GENERATING ELECTRIC ENERGY

BACKGROUND

The present invention relates, generally, to the field of electric machines, and, in particular, to a variable speed electric machine and method for generating electric energy.

Energy demands of the world today have risen above the supply of energy from naturally existing sources like fossil fuels. Conventional energy generation methods include combustion of fossil fuels to create energy that is then transformed into electric energy. Renewable forms of energy, such as solar power, and wind power, have become increasingly important to meet the ever increasing energy demands. Wind energy is utilized to generate electric energy with the help of a turbine that, in its simplest form, has a rotor with rotor blades and a generator shaft coupled to the rotor. The wind energy causes the rotor to rotate and in turn rotate the generator shaft to generate electric energy through the generator configuration. Generating energy through such means has its own set of disadvantages that include the variability of wind speed experienced by the rotor blades.

Several modern day wind turbines include a power converter that is solely responsible for balancing the variation in the input wind speed in such a way that the output provided by the wind turbine, which is supplied to an electric grid, is of constant frequency. Power converters are expensive, since they involve electronic equipment that is manufactured to precision. Hence, utilizing only power converters to balance the variation in input speed has proven to be expensive in most wind applications.

Researchers have also utilized doubly-fed induction machines as electric generators to produce electric output with constant electric frequency. For operation, doubly-fed induction machines are required to be fed some amount of excitation energy. The excitation energy is provided through a feedback loop between the electrical grid, the wind turbine, and the induction machine. Typically, the doubly-fed induction machines require about 30% of the wind turbine power to be operational.

Hence, there is a need for an electric machine that can be operational on variable speeds and produce constant frequency output electric energy and require negligible power for operations.

BRIEF DESCRIPTION

In one embodiment, an electric machine that includes an outer stator is provided. The outer stator has a first set of field windings. Further, the electric machine includes a modulator outer rotor that is concentric and is located proximate to the outer stator. The modulator outer rotor is operatively coupled to an input shaft. Furthermore the electric machine includes a permanent magnet inner rotor concentric to the modulator outer rotor. The electric machine also includes an inner stator with a second set of field windings. The inner stator is concentric to the inner rotor and is operatively coupled to an electric grid. The outer stator, the modulator outer rotor, inner stator and the inner rotor are magnetically coupled with each other so as to maintain a constant frequency of electric energy generated at the inner stator.

In another embodiment, an energy generation system is provided. The energy generation system includes a rotor that converts wind energy to rotational energy. The energy generation system further includes an electric machine operatively coupled to the rotor to convert the rotational energy to electric energy. The electric machine and the rotor are coupled via an input shaft. The electric machine includes an outer stator with a first set of field windings. The electric machine further includes a modulator outer rotor concentric and located proximate to the outer stator. The modulator outer rotor is operatively coupled to the input shaft. The electric machine further includes a permanent magnet inner rotor concentric to the modulator outer rotor. The electric machine also includes an inner stator, which is concentric to the inner rotor, with a second set of field windings operatively coupled to an electric grid. Further, the energy generation system includes a power converter to transfer energy of a pre-determined frequency from the modulator outer rotor to the inner stator. The energy is transferred through a magnetic coupling between the outer stator, the modulator outer rotor, the permanent magnet inner rotor, and the inner stator, to maintain a constant frequency of the electric energy generated at the inner stator.

In yet another embodiment, a method for generating constant frequency electric energy from an electric machine is provided. The method includes magnetically coupling an inner stator of the electric machine with a modulator outer rotor. The inner stator and the modulator outer rotor are magnetically coupled via a permanent magnet inner rotor and an outer stator. Further, the method includes selectively energizing a first set of field windings of the outer stator with an electric signal. Furthermore, the method includes transferring energy of pre-determined frequency to the inner stator through the magnetic coupling between the outer stator, the modulator outer rotor, the permanent magnet inner rotor, and the inner stator. The method also includes the step of controlling the electric signal energizing the first set of field windings of the outer stator based on an output parameter to maintain constant frequency for electric energy generated at the inner stator.

DRAWINGS

The present invention will be better understood from reading the following description of non-limiting embodiments, with reference to the attached drawings, wherein below:

DETAILED DESCRIPTION

Figure 1:
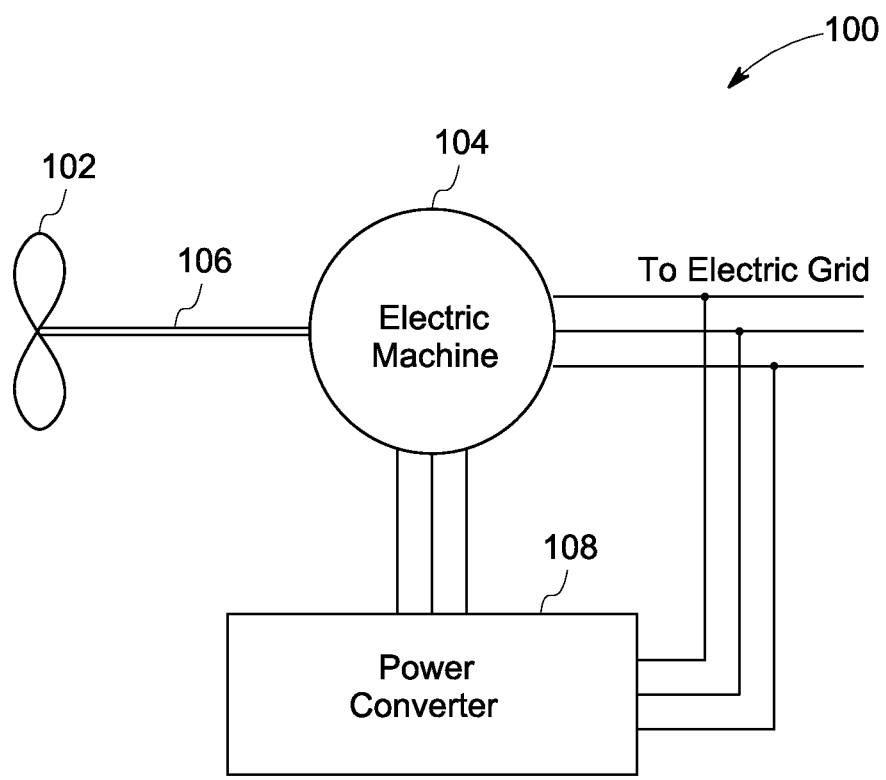
FIG. 1 illustrates an energy generation system utilizing an electric machine, in accordance with an embodiment of the invention.

Reference will be made below in detail to exemplary embodiments of the invention, examples of which are illustrated in the accompanying drawings. Wherever possible, the same reference numerals used throughout the drawings refer to the same or like parts.

Embodiments of the invention described herein relate to an electric machine that can generate constant frequency electric energy when an input provided to the electric machine is of varying frequency/speed. The input to the electric machine, in some embodiments, can be rotational energy obtained from wind of varying speed experienced by rotors of a wind turbine. The electric machine has an inner and an outer stator, which have a first set of field windings and a second set of field windings respectively. The outer stator, in one embodiment, is employed as a control stator. The inner stator is connected to an electric grid to supply the generated electric energy for consumption. The electric machine also includes a modulator outer rotor and a permanent magnet inner rotor that are placed concentric with and between the inner and outer stator. The modulator outer rotor, the permanent magnet inner rotor, the outer stator, and the inner stator are coupled by a magnetic flux generated by the excitation of the outer stator. The modulator outer rotor modulates the magnetic flux generated at the permanent magnet inner rotor and in a gear like fashion transfers energy of predetermined frequency from the modulator outer rotor to the inner stator. The rotational mechanical energy (speed and torque) from the modulator outer rotor is transferred to the inner stator and converted into the form of electric energy. The foregoing is described in greater detail in the subsequent paragraphs with the help of accompanied drawings.

FIG. 1 is a schematic illustration of an energy generation system 100, in an exemplary embodiment. The energy generation system 100 includes a rotor 102 that receives wind energy and converts it to rotational energy. The rotor 102 is operatively coupled with an electric machine 104, which will be described in greater detail in conjunction with FIG. 2. The electric machine 104 includes an outer stator, modulator outer rotor, permanent magnet inner rotor, and an inner stator (illustrated in FIG. 2). The modulator outer rotor is operatively coupled to an input shaft 106 of the energy generation system 100. Further, the energy generation system 100 includes a power converter 108 that transfers energy with pre-determined frequency from the modulator outer rotor, to the inner stator of the electric machine 104. The power converter 108 is operatively coupled to the outer stator, through a first set of field windings of the outer stator. Further, the inner stator is operatively coupled to an electric grid to supply the generated electric energy to the electric grid. The power converter 108 is operated to control the outer stator's interaction with the other components of the electric machine 104. The power converter 108 controls excitation of the outer stator so that the magnetic flux generated by the interaction between the outer stator, modulator outer rotor, permanent magnet inner rotor, and the inner stator is controlled in order to transfer energy with pre-determined frequency to the inner stator from the modulator outer rotor. In the electric machine 104, rotational energy at the modulator outer rotor is transferred to the inner stator as electric energy. The rotational energy transferred, in the form of speed or torque, from the modulator outer rotor is determined to facilitate generation of electric energy with constant frequency at the inner stator.

In one embodiment, the power converter 108 is operatively coupled with the electric grid. The power converter 108 supplies an electric signal to selectively energize the outer stator. The electric signal received from the electric grid is controlled based on an input velocity experienced by the rotor 102 and in turn by the input shaft 106. In certain embodiments, the input velocity is measured via a tachometer or position encoder. Examples of tachometers or velocity sensors include, but are not limited to, optical position encoders, eddy current devices, reflective tachometers, or any other velocity measurement devices.

In another embodiment, the power converter 108 is operatively coupled to the inner stator of the electric machine 104, when the outer stator of the electric machine 104, operatively coupled with the electric grid, supplies electric energy with a constant frequency to the electric grid.

Figure 2:
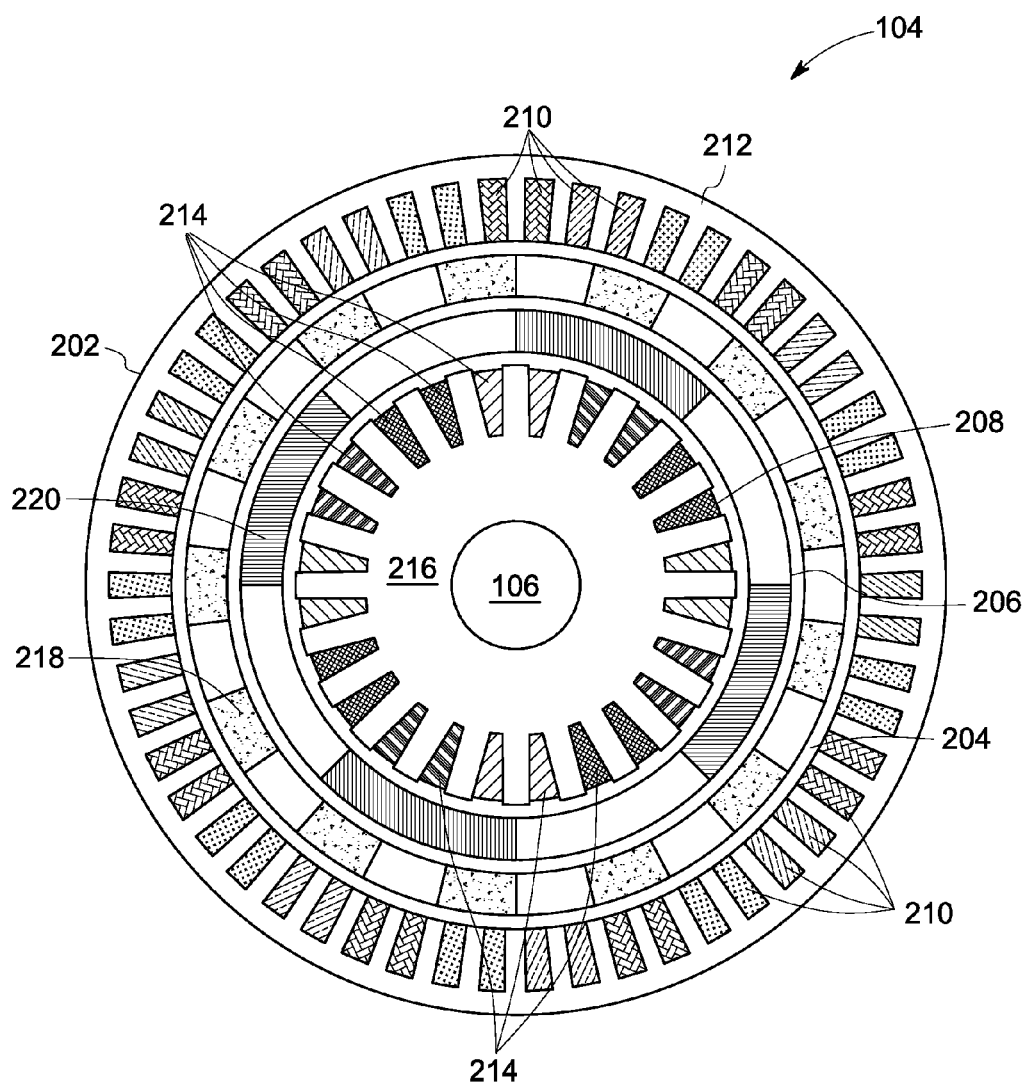
FIG. 2 illustrates an axial section of the electric machine in accordance with an embodiment of the invention.

Referring now to FIG. 2, an axial section of the electric machine 104 is illustrated, in accordance with one embodiment of the present invention. The electric machine 104 includes an outer stator 202 with a first set of field windings 210. The outer stator is supported by a back iron 212. Further, the electric machine 104 includes a modulator outer rotor 204 that is concentric to the outer stator 202. The modulator outer rotor 204 includes a plurality of pole pieces 218. The modulator outer rotor 204 is operatively connected to the input shaft 106. Furthermore, a permanent magnet inner rotor 206 is positioned concentric to the modulator outer rotor 204. The permanent magnet inner rotor 206 has a plurality of pole pieces 220 housed at equal distance around the circumference. The electric machine 104 also includes an inner stator 208 having a second set of field windings 214 and is positioned concentric to the permanent magnet inner rotor 206. Further, the inner stator 208 is connected to an electric grid via various phases of the second set of field windings 214. In certain embodiments, the first and second set of field windings 210 and 214 embody magnetic pole pairs that couple with the plurality of pole pieces 218 and 220.

In an embodiment, the modulator outer rotor 204 is fabricated from a magnetically and electrically passive material, with sintered or laminated iron pole pieces 218 housed within or fastened to the passive material. For example, the modulator outer rotor 204 may be fabricated from glass fiber wrapped in stages, such that the pole pieces 218 may be placed within open hollows of the rotor partway. Further, the permanent magnet inner rotor 206 is fabricated from a permanent magnet material, with the plurality of pole pieces 220 housed at equal distance around the permanent magnet inner rotor 206. Examples of permanent magnet materials that may be used for permanent magnet inner rotor 206 include but are not limited to ferromagnetic substances like iron ore, cobalt, or nickel, or rare earth metals like gadolinium or alloys like alnico, or neodymium.

The outer stator 202 from the electric machine 104 is connected to a power converter (e.g. the power converter 108) through the first set of field windings 210. The power converter 108 provides an electric signal to energize the outer stator 202. The energized outer stator 202 produces a rotating magnetic field, which leads to generation of torque. The modulator outer rotor 204 is set in motion due to the rotating magnetic field generated by the outer stator 202. The magnetic field generated by the outer stator, and the rotating motion caused by the magnetic field in the modulator outer rotor 204 leads to rotating motion of the permanent magnet inner rotor 206. The rotational speed of the permanent magnet inner rotor 206 is dependent on the excitation signal provided to the outer stator 202 by the power converter 108. The motion in the permanent magnet inner rotor 206 leads to transfer of energy to the inner stator 208. The energy being transferred from the permanent magnet inner rotor 206 is converted to electrical energy at the inner stator 208. The electric energy generated at the inner stator 208 exhibits a constant frequency.

As illustrated in FIG. 1, the input shaft 106 is coupled to the rotor 102 of a wind turbine. The rotor 102 of the wind turbine receives wind energy. The wind energy incident on the rotor 102 is converted to rotational energy by the input shaft 106 that is coupled to the rotor 102. The input shaft 106, being coupled to the modulator outer rotor 204, sets the modulator outer rotor 204 in motion and causes electric energy to be generated in the electric machine 104. The power converter 108 receives electric signal from the electric grid to control the rotating magnetic field developed by the outer stator 202. The electric signal received from the electric grid is controlled based on an input velocity of the rotor 102 and in turn by the input shaft 106. The electric signal to control the outer stator 202 is calculated based on the difference between the input velocity observed at the rotor 102 and input velocity required to generate electric energy of constant frequency. In other embodiments, any system that generates mechanical energy can be coupled with the electric machine 104 through the input shaft 106.

In the embodiment illustrated in FIG. 2, the first set of field windings 210 comprise 9 pole pairs (POS) formed out of the 54 stator slots positioned around the back iron 212. Similarly, the second set of field windings 214 comprises 4 pole pairs (PIS) formed out of the 24 stator slots positioned around the inner stator 208. The number of flux modulating pole pieces (NOR) 218 is commonly calculated by the formula NOR=POS+PIS. By selecting the plurality of pole pieces 218 according to the aforementioned formula, the permanent magnet inner rotor 206 and the outer stator 202 are coupled in a gear like fashion owing to highest space harmonic flux component of the magnetic fields acting between the inner stator 208, the outer stator 202, the modulator outer rotor 204, and the permanent magnet inner rotor 206. In the illustrated embodiment, the number of pole pieces 218 (NOR) is 13.

The magnetic flux developed at the outer stator 202 engages the modulator outer rotor 204, the permanent magnet inner rotor 206, and the inner stator 208. The interaction between the components of the electric machine 104 is similar to a magnetic gear. The mechanically equivalent rotational frequencies of the rotating magnetic fields of the outer stator 202 ($\Omega_{OS}$) and that of the inner stator 208 ($\Omega_{IS}$) is defined by:

$$\Omega_{OS} = \frac{\omega_{OS}}{P_{OS}} \quad (1)$$

$$\Omega_{IS} = \frac{\omega_{IS}}{P_{IS}}$$

In an embodiment, the electric frequency at the inner stator 208 ($\omega IS$) is maintained at the electric frequency of the electric grid ($\omega$grid). The fundamental frequency of the permanent magnet inner rotor 206, owing to the magnetic coupling between the inner stator 208 and the permanent magnet inner rotor 206, is the same as the frequency of the magnetic flux developed at inner stator 208. Further, the outer stator 202 generates a rotating magnetic field at a constant frequency ($\omega OS$), owing to the coupling with the power converter 108. The frequency of rotation of the modulator outer rotor 204 is known, since the modulator outer rotor 204 is operatively coupled to the input shaft 106. Using these known parameters, the speed of rotation of the permanent magnet inner rotor 206 ($\Omega_{PM}$) can be calculated using the following formula:

$$\Omega_{PM} = \left( \frac{m}{m \cdot P_{OS} + k \cdot N_{OR}} \cdot \omega_{OS} + \frac{k \cdot N_{OR}}{m \cdot P_{OS} + k \cdot N_{OR}} \cdot \Omega_{OR} \right) \ldots \quad (2)$$

where m and k are constants, and $N_{OR}$ is the number of pole pieces 218 on the modulator outer rotor 204, $P_{OS}$ is the number of pole pairs on the outer stator 202, and $\Omega_{OR}$ is the speed of rotation of the modulator outer rotor 204.

The frequency of electric signal required to be supplied to the outer stator 202 so that the electric frequency observed at the inner stator 208 is maintained at $\omega$grid can be calculated using equations 1 and 2 and the following equation:

$$\omega_{OS} = \left( \frac{\omega_{grid}}{P_{IS}} - \frac{k \cdot N_{OR}}{m \cdot P_{OS} + k \cdot N_{OR}} \cdot \Omega_{OR} \right) \cdot \frac{m \cdot P_{OS} + k \cdot N_{OR}}{m} \quad (3)$$

The design of the electric machine 104 is driven by, among other parameters, the number of pole pairs on the first set of field windings 210, the number of pole pairs on the second set of field windings 214, the number of pole pieces 218, and the number of permanent magnet pole pieces 220. The number of pole pairs on the first and second set of field windings 210 and 214 and the number of pole pieces 218 and 220 are selected so that the magnetic field between the outer stator 202, the modulator outer rotor 204, the permanent magnet inner rotor 206, and the inner stator 208 operate in a gear-like fashion, where energy is transferred between the movable rotors 204 and 206 thereby ensuring that energy with predetermined frequency is transferred from the modulator outer rotor 204 to the inner stator 208. The power converter is adjusted to control the energy flow from the modulator outer rotor 204 and the inner stator 208.

In another embodiment, the outer stator 202 is operatively coupled to the electric grid to provide the constant frequency electric energy. In such a configuration, the inner stator 208 is connected to the power converter 108 so that the inner stator 208 can be selectively energized by the power converter 108 to control the frequency of electric energy generated at the outer stator 202.

In other embodiments, in the electric machine 104, the permanent magnet inner rotor 206 is concentric to the outer stator 202. The permanent magnet inner rotor 206 is operatively connected to the input shaft 106. The modulator outer rotor 204 is positioned concentric to the permanent magnet inner rotor 206. The inner stator 208 is positioned concentric to the modulator outer rotor 204. Furthermore, the position of the outer stator 202 and the inner stator 208 can be interchanged along with the change of positions in the modulator outer rotor 204 and the permanent magnet inner rotor 206.

In certain embodiments, the power converter can be implemented using digital circuitry such as transistors, for example. The power converter can also be implemented as a software solution that is configured to receive an input for drawing energy from the electric grid and modulate the energy drawn from the electric grid to generate the electric signal required for the outer stator 202, as required by the aforementioned equation 3.

Figure 3:
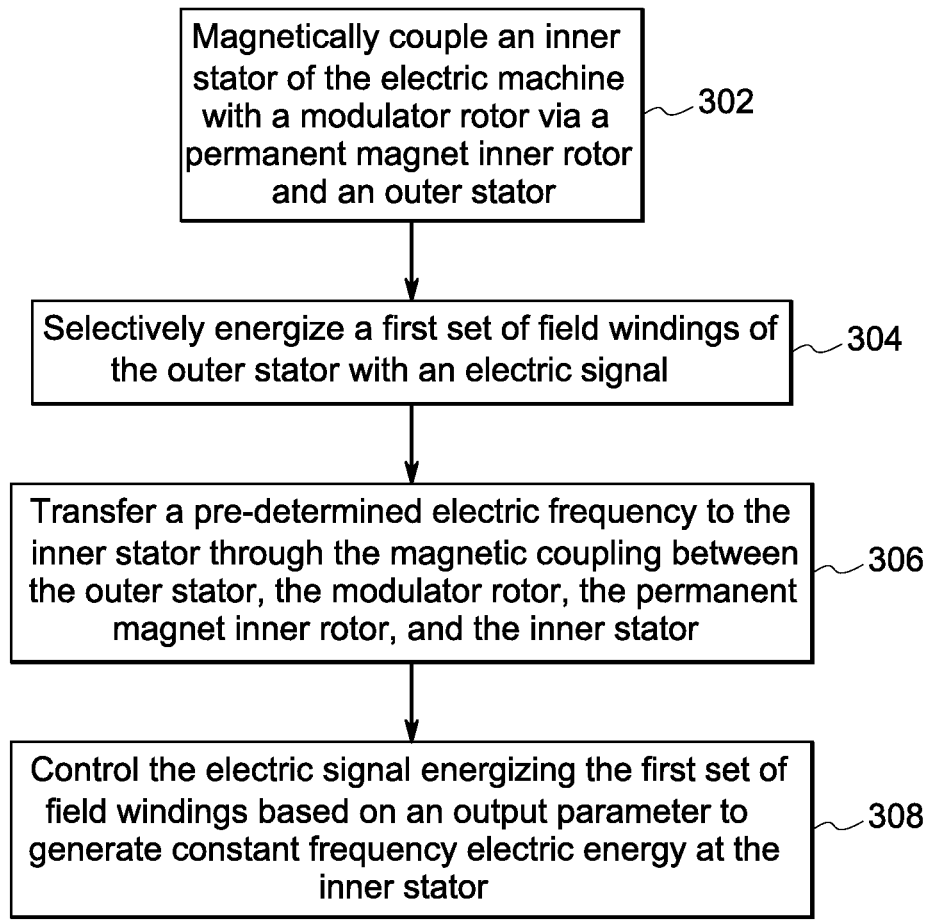
FIG. 3 is a flow chart representing a method for generating constant frequency electric energy from an electric machine, in accordance with one embodiment of the present invention.

Referring now to FIG. 3, a flow diagram for a method for generating constant frequency electric energy from the electric machine 104 is shown, in accordance with one embodiment of the present invention. The method includes a step 302 of magnetically coupling inner stator 208 of the electric machine with modulator outer rotor 204. The magnetic coupling is achieved via the outer stator 202, and the permanent magnet inner rotor 206. The components of the electric machine 104 are placed in a concentric arrangement, with the outer stator 202 forming the base of the electric machine 104. The method further includes the step 304 of selectively energizing the first set of field windings 210 of the outer stator 202 with an electric signal. At step 306, energy of pre-determined frequency is transferred from the modulator outer rotor 204 to the inner stator 208 through the magnetic coupling between the outer stator 202, the modulator outer rotor 204, the permanent magnet inner rotor 206, and the inner stator 208. Further, at step 308, the electric signal to selectively energize the outer stator 202 is controlled to ensure constant frequency electric energy is generated at the inner stator 208.

In one embodiment, input shaft 106 is operatively coupled to the modulator outer rotor. In certain embodiments, the electric signal is controlled based on an output parameter such as the velocity of the input shaft, or frequency of electric energy at the inner stator 208 or a combination of both. Further, the method includes the step of operatively coupling the first set of field windings 210 to power converter 108 to selectively energize the outer stator 202. The power converter 108 is implemented using either hardware, or software, or a combination of both. The power converter 108 is further coupled with an electric grid to receive electric signals for selectively energizing the outer stator 202. In one embodiment, the inner stator 208 is operatively coupled to the electric grid to supply constant frequency electric energy generated at the inner stator 208 to the electric grid.

The electric signal provided by the power converter 108 is adjusted so that the rotating magnetic field generated at the outer stator 202 transfers energy from the modulator outer rotor 204 to the inner stator 208, which controls the frequency of electric energy generated at the inner stator 208. In one embodiment, the power converter 108 uses the equations 1, 2, and 3 detailed in the earlier paragraphs of this application to control the frequency of electric signal used to energize the outer stator 202. The power converter 108 supplies the electric signal to the outer stator 202 when the output parameter is less than an expected threshold. For an example, when the frequency of the electric energy at the inner stator 208 is less than an expected frequency of 60 Hz, the outer stator 202 is energized to transfer energy from the modulator outer rotor 204 to the inner stator 208. In another embodiment of the present invention, when the output parameter exceeds the expected threshold, the power converter 108 draws an appropriate portion of the electric energy generated at the inner stator 208 to keep the output energy at constant frequency.

Figure 4:
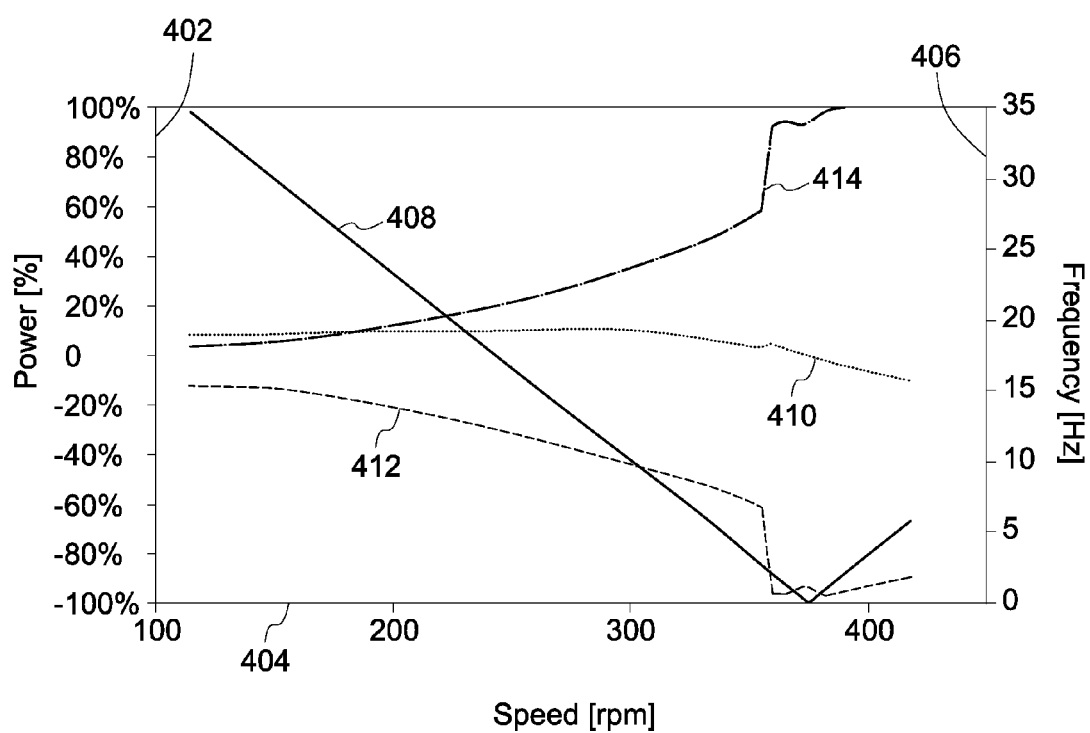
FIG. 4 illustrates a graphical representation of an energy flow in the electric machine of FIG. 2 in accordance with an embodiment of the invention.

Referring now to FIG. 4, a graphical representation of an exemplary energy flow profile of a wind energy generation system setup is shown. Axis 402 in the profile represents power in the form of percentage. Axis 404 represents wind velocity experienced by the rotor 102. Axis 406 represents electric frequency of the power converter 108. The input energy at the input shaft 106 (represented by line 414) is a measure of the wind velocity experienced by the rotor 102 of the wind energy generation system. FIG. 4 shows that the input energy experienced by the input shaft 106 is split in two components: the electric energy at the inner stator 208 (represented by line 412), and electric energy at the outer stator 202 (represented by line 410). The electric energy experienced at the inner stator 208 is transferred to the electric grid, since the inner stator 208, in one embodiment, is coupled to the electric grid. The electric energy at the outer stator 202 is the energy provided to the outer stator 202 by the power converter 108. The energy is split in such a way that a balance of energy is maintained at the input and the output side of the wind energy generation system. In the example setup, the velocity experienced by the rotor 102 is in the range between about 115 rpm to about 420 rpm. The wind energy generation system, in other words, experiences a wind profile with a mean of 267 rpm and a variance of ±57% around the mean. Line 408 represents the frequency range in which the power converter 108 operates during the operation of the electric machine 104. The power converter 108, which is operatively coupled to the outer stator 202, operates in the frequency range of 0-35 Hz, as can be seen from line 408. The power converter 108 and the outer stator 202, as shown in line 410, draws energy in the range of −10% to +10% from the electric machine 104 or the electric grid. It can be seen from the lines 414 and 410 that when the velocity experienced at the input shaft 106 is greater than 375 rpm, the power converter 108 draws energy from the electric machine 104 and supplies it to the electric grid. This is represented by the points below 0% on the line 410 for input velocity above 375 rpm. However, when the velocity is between 115 rpm to 375 rpm, the power converter 108 draws electric energy from the electric grid such that the outer stator 202 is energized. This can be seen from the points above 0% on the line 410 for input velocity between 115 rpm to 375 rpm.

The various embodiments of the variable speed electric machine and the method to generate electric energy described above thus provide constant frequency electric energy in response to a variable speed input, by controlling the magnetic flux between different components of the electric machine 104. The configuration described in this patent application provides constant frequency electric energy by utilizing only ~10% of the input energy in comparison to the 30% consumption of input energy, by traditional doubly fed induction machines. Further, the electric machine, according to various embodiments of the present invention, also allows for a flexibility to handle higher speeds of input velocity, by changing the first and second set of field windings.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person of ordinary skill in the art to practice the embodiments of invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described variable speed electric machine, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. An electric machine, comprising:
    an outer stator with a first set of field windings;
    a modulator outer rotor comprising magnetically and electrically passive material and disposed concentric and proximate to the outer stator, wherein the modulator outer rotor is operatively coupled to an input shaft;
    a permanent magnet inner rotor concentric to the modulator outer rotor; and
    an inner stator with a second set of field windings concentric to the inner rotor operatively coupled to an electric grid; wherein the outer stator, the modulator outer rotor, the inner stator and the inner rotor are magnetically coupled with each other to maintain a constant electric frequency at the inner stator;
    wherein the modulator outer rotor and the permanent magnet inner rotor are located between the inner stator and the outer stator.

2. The electric machine of claim 1, wherein the input shaft is operatively coupled to a rotor of a wind turbine to convert wind energy to rotational energy.

3. The electric machine of claim 1 comprising a power converter operatively coupled to the outer stator to selectively energize the outer stator.

4. The electric machine of claim 3, wherein the power converter is connected to the electric grid to receive an electric signal to selectively energize the outer stator.

5. The electric machine of claim 4, wherein the power converter is configured to vary the electric signal received from the electric grid such that the constant electric frequency is maintained by transferring energy of pre-determined frequency from the modulator outer rotor to the inner stator through the magnetic coupling between the outer stator, the modulator outer rotor, the permanent magnet inner rotor, and the inner stator.

6. The electric machine of claim 5, wherein the electric signal provided to the power converter is controlled based on an input velocity at the input shaft.

7. The electric machine of claim 3, wherein the power converter is operatively coupled with the inner stator to selectively energize the inner stator.

8. The electric machine of claim 7, wherein the outer stator is operatively coupled with the electric grid when the power converter is coupled with the inner stator.

9. The electric machine of claim 1, wherein the magnetically and electrically passive material comprises glass fiber.

10. An energy generation system comprising:
    a rotor that converts wind energy to rotational energy; and
    an electric machine operatively coupled to the rotor to convert the rotational energy to electric energy, wherein the electric machine comprises:
        an outer stator with a first set of field windings;
        a modulator outer rotor concentric and located proximate to the outer stator, wherein the modulator outer rotor is operatively coupled to an input shaft;
        a permanent magnet inner rotor concentric to the modulator outer rotor; and
        an inner stator with a second set of field windings concentric to the inner rotor operatively coupled to an electric grid; and
    a power converter configured to transfer energy of pre-determined frequency from the modulator outer rotor to the inner stator through a magnetic coupling between the outer stator, the modulator outer rotor, the permanent magnet inner rotor, and the inner stator, to maintain a constant frequency of electric energy supplied by the inner stator to the electric grid.

11. The energy generation system of claim 10, wherein the power converter is operatively coupled to the outer stator to selectively energize the outer stator.

12. The energy generation system of claim 11, wherein the power converter is connected to the electric grid to receive an electric signal to selectively energize the outer stator.

13. The energy generation system of claim 12, wherein the electric signal received by the power converter is controlled based on an input velocity at the input shaft.

14. The energy generation system of claim 10, wherein the power converter is operatively coupled with the inner stator.

15. The energy generation system of claim 14, wherein the outer stator is operatively coupled with the electric grid when the power converter is coupled with the inner stator.

16. A method for generating constant frequency electric energy from an electric machine, the method comprising:
    magnetically coupling an inner stator of the electric machine with a modulator outer rotor, wherein the inner stator and the modulator outer rotor are magnetically coupled via a permanent magnet inner rotor and an outer stator;
    selectively energizing a first set of field windings of the outer stator with an electric signal;
    transferring energy of pre-determined frequency to the inner stator through the magnetic coupling between the outer stator, the modulator outer rotor, the permanent magnet inner rotor, and the inner stator; and
    controlling the electric signal energizing the first set of field windings of the outer stator based on an output parameter to maintain constant frequency of electric energy generated at the inner stator.

17. The method as recited in claim 16 further comprises coupling an input shaft to the modulator outer rotor.

18. The method as claimed in claim 17, wherein the output parameter comprises at least one of a velocity of the input shaft, and frequency of electric energy generated at the inner stator, or a combination of both.

19. The method as recited in claim 16 further comprising operatively coupling the first set of field windings on the outer stator with a power converter.

20. The method as recited in claim 19 further comprising connecting the power converter with an electric grid to receive the electric signal for the first set of field windings.

21. The method as recited in claim 16 further comprising operatively coupling the inner stator to an electric grid to supply the electric energy generated at the inner stator.

* * * * *